United States Patent Office 3,509,147
Patented Apr. 28, 1970

3,509,147
ISOINDOLOQUINAZOLINES
William J. Houlihan, Mountain Lakes, N.J., assignor to Sandoz Inc., Hanover, N.J.
No Drawing. Continuation-in-part of application Ser. No. 379,711, July 1, 1964. This application Nov. 3, 1966, Ser. No. 591,694
Int. Cl. C07d 51/48, 87/08
U.S. Cl. 260—251
13 Claims

ABSTRACT OF THE DISCLOSURE

ISOINDOLOQUINAZOLINES, e.g., 6a-phenyl-6,6a-dihydroisoindolo[2,1-a]quinazoline-5,11-dione, useful as CNS agents.

---

This is a continuation-in-part of application Ser. No. 379,711 filed July 1, 1964, now abandoned.

The present invention is directed to pharmaceutically acceptable CNS (central nervous system) active isoindoloquinazolines which are useful as sedatives, analgesics and antihypertensives. The particular one of these uses for which a specific embodiment is best suited varies from compound to compound within the noted utilities.

More particularly, the principal CNS active isoindoloquinazolines of this invention are either (a) 3-$R^1$-6-$R^2$-6a-(3'-$R^3$-4'-$R^4$-5'-$R^5$-phenyl)-8-$R^6$-9-$R^7$-6,6a-dihydroisoindolo[2,1-a]quinazolin-5(11H)-ones of the formula

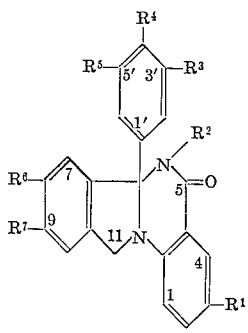

(Ia)

(b) 3-$R^1$-6-$R^2$-6a-(3'-$R^3$-4'-$R^4$-5'-$R^5$-phenyl)-8-$R^6$-9-$R^7$-6,6a-dihydroisoindolo-[2,1-a]quinazoline-5,11-diones of the formula

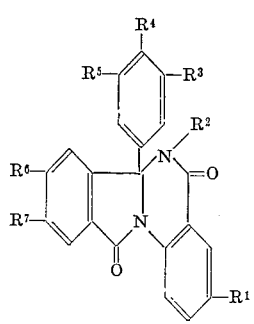

(Ib)

(c) 3-$R^1$-5-hydroxy-6-$R^2$-6a-(3'-$R^3$-4'-$R^4$-5'-$R^5$-phenyl)-8-$R^6$-9-$R^7$-5,6,6a,11-tetrahydroisoindolo[2,1-a]quinazolines of the formula

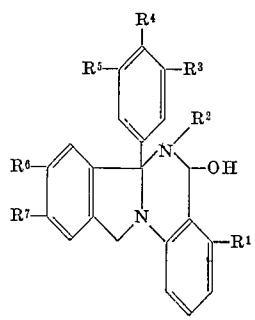

(II)

or (d) 3-$R^1$-6-$R^2$-6a-(3'-$R^3$-4'-$R^4$-5'-$R^5$-phenyl)-8-$R^6$-9-$R^7$-5,6,6a,11-tetrahydroisoindolo[2,1-a]quinazolines of the formula

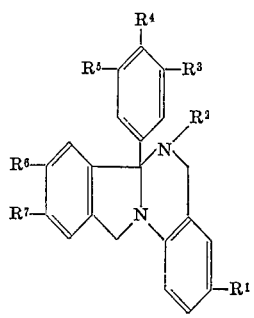

(III)

wherein each of $R^1$, $R^3$, $R^4$, $R^5$, $R^6$ and $R^7$ is either hydrogen (—H); lower alkyl, e.g. methyl, ethyl, propyl, butyl, and amyl; lower alkoxy, e.g. methoxy, ethoxy, propoxy, butoxy and pentoxy; fluoro (—F); chloro (—Cl); bromo (—Br); or trifluoromethyl (—CF$_3$); with the proviso that, in any compound, $R^4$ is not trifluoromethyl when either $R^3$ or $R^5$ is trifluoromethyl; otherwise, the definitions of the R's are independent; and $R^2$ is either a hydrogen atom (—H); straight chain lower alkyl of from 1 to 4 carbon atoms, e.g. methyl, ethyl and butyl; allyl; cis-2-butenyl; trans-2-butenyl; 3-butenyl; ω-di(lower)alkylamino(lower)alkyl, e.g. γ-(N-methyl-N-ethyl-amino)-propyl; ω-piperidino(lower)alkyl, e.g. β-piperidinoethyl, ω-morpholino(lower)alkyl, e.g. morpholinobutyl; ω-pyrrolidino(lower)alkyl, e.g. ω-pyrrolidinoamyl; ω-4-(lower)alkylpiperazino-(lower)alkyl, e.g. β-(4-methylpiperazino)-ethyl; or propargyl.

For compounds I, II and III, $R^2$ is also the pharmaceutically acceptable quaternary ammonium, e.g., lower alkyl halide (such as the methyl iodide, the ethyl bromide and the propyl chloride), and acid addition, e.g., hydrochloride, hydrobromide, sulfuric acid, phosphoric acid, oxalic acid, fumaric acid, tartaric acid, citric acid, salicyclic acid, benzoic acid, acetic acid, methane sulfonic acid, benzene sulfonic acid, sulfamic acid and toluene sulfonic acid, salts of the noted tertiary amines. Since the nitrogen atom in the 6-position of Compounds II and III is basic, the corresponding quaternary ammonium and acid addition salts at said position are also within the preview of this invention.

The isoindoloquinazolines of this invention are prepared according to the reactions:

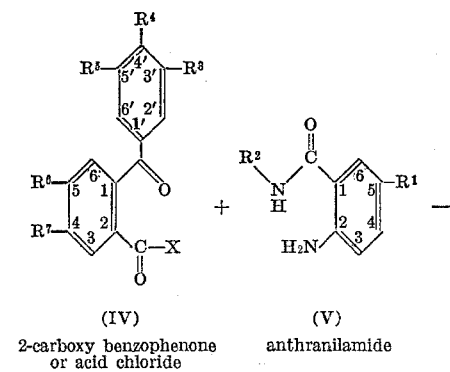

(A)

(Ib) + LiAlH₄ ⟶ (Ia) and/or (III)  (B)

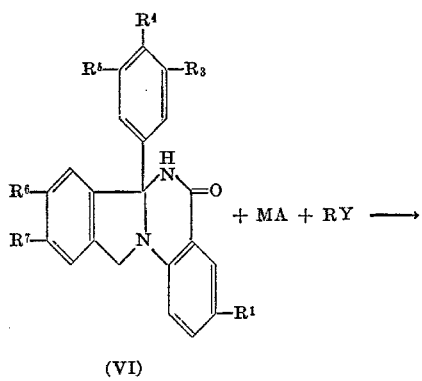

+ MA + RY ⟶

(VI)

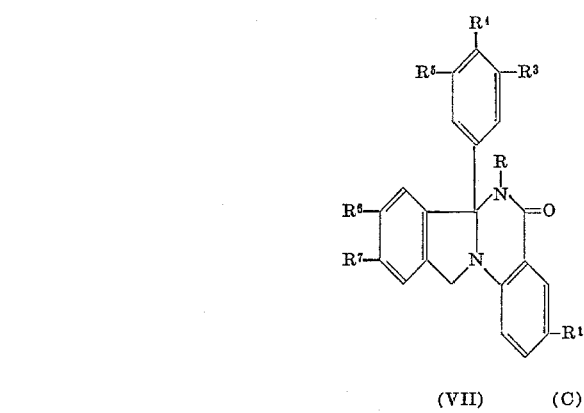

(VII)  (C)

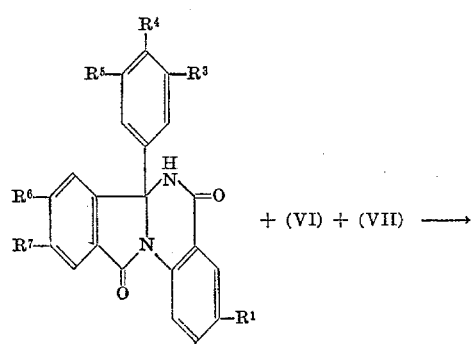

+ (VI) + (VII) ⟶

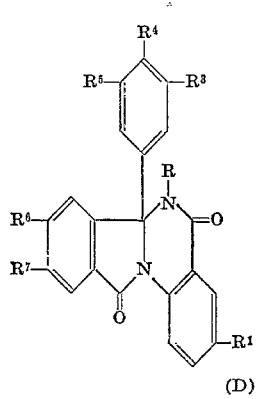

(D)

(Ia) + LiAlH₄ ⟶ (II) and/or (III)  (E)

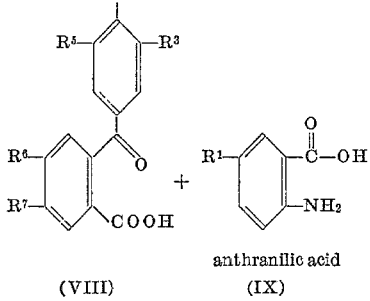

(VIII)      (IX)

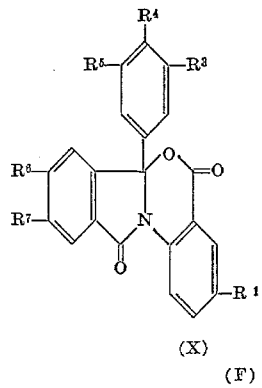

(X)

(F)

(X) + R²—NH₂ ⟶ (Ib)  (G)

wherein R is either linear (straight chain) lower alkyl, e.g. methyl, ethyl, propyl and butyl; allyl; cis-2-butenyl; trans-2-butenyl; ω-di(lower)alkylamino(lower)alkyl, e.g. γ-(N-methyl-N-ethyl-amino)propyl; ω-piperidino(lower)alkyl, e.g. β-piperidinoethyl; ω-morpholino-(lower)alkyl, e.g. ω-morpholino-butyl; ω-pyrrolidino(lower)alkyl, e.g. ω-pyrrolidinoamyl; ω-4-(lower)alkyl-piperazino-(lower)alkyl, e.g. β-(4-methyl-piperazino)-ethyl; or propargyl;

each of $R^1$, $R^2$, $R^3$, $R^4$, $R^5$, $R^6$ and $R^7$ has the same meaning as previously set forth;

A is either a hydrogen atom (—H) or primary amino (—NH₂);

M is either a lithium atom (—Li), a sodium atom (—Na) or a potassium atom (—K);

X is either hydroxyl (—OH) or a chlorine atom (—Cl); and

Y is either a chlorine atom (—Cl), a bromine atom (—Br) or an iodine atom (—I).

All of the compounds of this invention are CNS active and are useful as such. The particular utility that a specific compound (within the purview of this invention) is best suited for, i.e., within the CNS area, is readily determined from a standard pharmacological screen.

Said compounds are administered either orally or parenterally to mammals in standard dosage forms, e.g., tablets and capsules, in daily dosages of from 1 milligram per kilogram to 4 milligrams per kilogram of body weight. Administration can be either in a single daily dose or in divided doses taken from two to four times during the course of a day.

Each of the pharmaceutically active compounds of this invention, may be e.g., incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compound is:

| Ingredient: | Parts by weight |
| --- | --- |
| Title compound of Example 1 | 50 |
| Tragacanth | 2 |
| Lactose | 39.5 |
| Corn starch | 5 |
| Talcum | 3 |
| Magnesium stearate | 0.5 |
| Alcohol SD–30 | |
| Purified water | q.s |

The following examples illustrate the invention, the parts and percentages being by weight unless otherwise stated, and the relationship of parts by weight to parts by volume being the same as that of the kilogram to the liter. All temperatures are in degrees centigrade.

*Reaction (A).*—When X is chlorine, i.e., when compound (IV) are in the form of the acid chloride, the reaction is effected in a polar solvent, such as N,N-dimethylformamide (DMF), diethylformamide, dioxane, chlorobenzene, dichlorobenzene and pyridine. Said reaction takes about two days at 60° C.

EXAMPLE 1

6a-phenyl-6,6a-dihydroisoindolo[2,1-a]quinazoline-5,11-dione

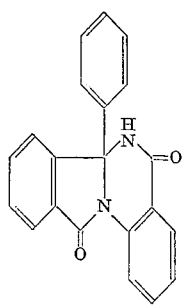

Dissolve 10.0 grams (g.) [0.073 mole] of anthranilamide, 15.0 g. [0.61 mole] of 2-carboxybenzophenone acid chloride and 5 milliliters (ml.) of pyridine in 100 ml. of dimethylformamide (DMF). Stir the resulting solution at 60° for two days (48 hours). Remove the solvent (DMF and pyridine) in vacuo and crystallize the resultant solid from methanol-water. The title compound, melting point (M.P.) in excess of 300°, is thus obtained.

The title compound of this example is particularly suitable as an analgesic.

EXAMPLE 2

3-methyl-6a-phenyl-6,6a-dihydroisoindolo[2,1-a]-quinazoline-5,11-dione

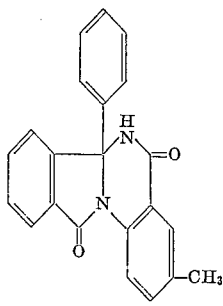

Dissolve 0.073 g. mole of 5-methlanthranilamide, 0.61 g. mole of 2-carboxybenzophenone acid chloride and 5 ml. of pyridine in 100 ml. of DMF. Stir the resulting solution at 60° for two days. Remove the solvent in vacuo to obtain the title compound.

EXAMPLE 3

3-chloro-6a-(4'-chloro-3'-propylphenyl)-6,6a-dihydroisoindolo[2,1-a]quinazoline-5,11-dione

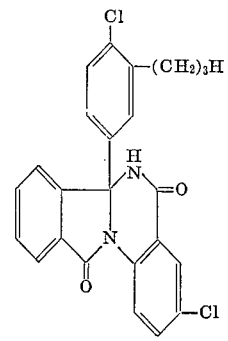

Dissolve 0.073 g. mole of 5-chloroanthranilamide, 0.61 g. mole of 2-carboxy-4'-chloro-3'-propyl-benzophenone acid chloride and 5 ml. of pyridine in 100 ml. of DMF. Stir the resulting solution at 60° for two days. Remove the solvent in vacuo to obtain the title compound.

EXAMPLE 4

3-bromo-6a-(3'-bromo-4'-ethoxyphenyl)-8-trifluoromethyl-6,6a-dihydroisoindolo[2,1-a]quinazoline-5,11-dione

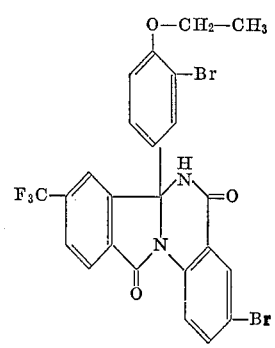

Dissolve 0.073 g. mole of 5-bromoanthranilamide, 0.61 g. mole of 3'-bromo-2-carboxy-4'-ethoxy-5-trifluoromethylbenzophenone acid chloride and 5 ml. of pyridine in 100 ml. of DMF. Stir the resulting solution at 60° for two days. Remove the solvent in vacuo to obtain the title compound.

EXAMPLE 5

3-bromo-6a-(3'-bromo-4'-ethoxyphenyl) - 6 - butyl-8-trifluoromethyl - 6,6a-dihydroisoindolo[2,1-a]quinazoline-5,11-dione

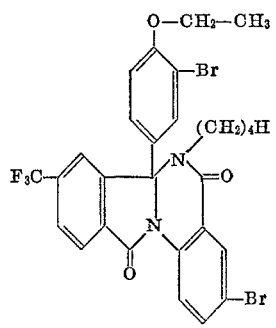

Dissolve 0.073 g. mole of 5-bromoanthranilic acid N-butylamide, 0.61 g. mole of 3'-bromo-2-carboxy-4'-ethoxy-5-trifluoromethylbenzophenone acid chloride and 5 ml. of pyridine in 100 ml. of DMF. Stir the resulting solution at 60° for two days. Remove the solvent in vacuo to obtain the title compound.

EXAMPLE 6

3-butoxy-9-chloro-6a-(3',5' - ditrifluoromethyl-4'-tolyl)-8-methoxy - 6,6a - dihydroisoindolo[2,1 - a]quinazoline-5,11-dione

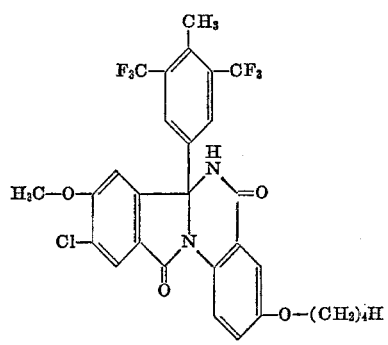

Dissolve 0.073 g. mole of 5-butoxyanthranilamide, 0.61 g. mole of 2-carboxy-4-chloro-3',5'-ditrifluoromethyl-5-methoxy-4'-methylbenzophenone acid chloride and 5 ml. of pyridine in 100 ml. of DMF. Stir the resulting solution at 60° for two days. Remove the solvent in vacuo to obtain the title compound.

EXAMPLE 7

8-chloro-6a-(3'-chlorophenyl)-3-ethyl-6,6a-dihydroisoindolo[2,1-a]quinazoline-5,11-dione

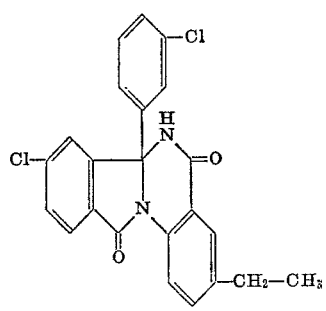

Dissolve 0.073 g. mole of 5-ethylanthranilamide, 0.61 g. mole of 2-carboxy-3'-5-dichlorobenzophenone acid chloride and 5 ml. of pyridine in 100 ml. of DMF. Stir the resulting solution at 60° for two days. Remove the solvent in vacuo to obtain the title compound.

EXAMPLE 8

6a-(3'-bromo-5'-trifluoromethylphenyl)-6,6a-dihydroisoindolo[2,1-a]quinazoline-5,11-dione

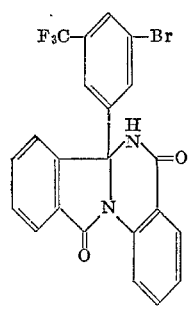

Dissolve 0.073 g. mole of anthranilamide, 0.61 g. mole of 3' - bromo - 2-carboxy-5'-trifluoromethylbenzophenone acid chloride and 5 ml. of pyridine in 100 ml. of DMF. Stir the resulting solution at 60° for two days. Remove the solvent in vacuo to obtain the title compound.

EXAMPLE 9

6a-(4'-bromo-3'-propoxyphenyl)-3-methoxy-6,6a-dihydroisoindolo[2,1-a]quinazoline-5,11-dione

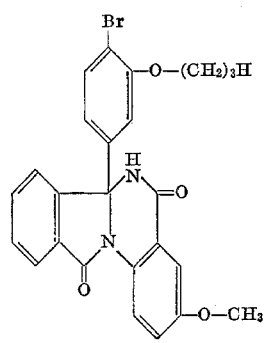

Dissolve 0.073 g. mole of 5-methoxyanthranilamide, 0.61 g. mole of 4'-bromo-2-carboxy-3'-propoxybenzophenone acid chloride and 5 ml. of pyridine in 100 ml. DMF. Stir the resulting solution at 60° for two days. Remove the solvent in vacuo to obtain the title compound.

EXAMPLE 10

3-butyl-6a-(4'-butyl-3',5'-difluorophenyl)-6,6a-dihydroisoindolo[2,1-a]quinazoline-5,11-dione

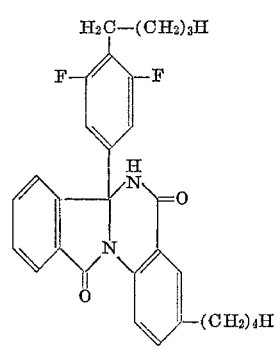

Dissolve 0.073 g. mole of 5-butylanthranilamide, 0.61 g. mole of 4' - butyl-2-carboxy-3',5'-difluorobenzophenone acid chloride and 5 ml. of pyridine in 100 ml. of DMF. Store the resulting solution at 60° for two days. Remove the solvent in vacuo to obtain the title compound.

EXAMPLE 11

3-amyl-6a-(3'-amyl-5'-chlorophenyl)-6,6a-dihydro-isoindolo[2,1-a]quinazoline-5,11-dione

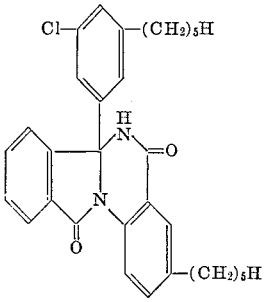

Dissolve 0.073 g. mole of 5-amylanthranilamide, 0.61 g. mole of 3'-amyl-2-carboxy-5'-chlorobenzophenone acid chloride and 5 ml. of pyridine in 100 ml. of DMF. Stir the resulting solution at 60° for two days. Remove the solvent in vacuo to obtain the title compound.

EXAMPLE 12

3-chloro-6a-phenyl-6,6a-dihydroisoindolo[2,1-a]-quinazoline-5,11-dione

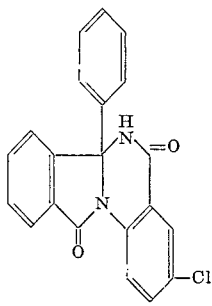

Dissolve 0.055 g. mole of 5-chloroanthranilamide and 0.05 g. mole of o-benzoylbenzoyl chloride in 75 ml. of absolute DMF. Stir the resulting solution at 60° for two days. Remove the DMF in vacuo and crystallize the resultant solid from methanol-water to obtain the hygroscopic title compound, M.P. in excess of 300°.

The title compound of this example is particularly suitable as a sedative and/or analgesic.

EXAMPLE 13

6a-(3'-ethylphenyl)-6,6a-dihydroisoindolo[2,1-a]-quinazoline-5,11-dione

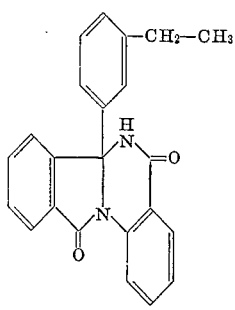

Dissolve 0.055 g. mole of anthranilamide and 0.05 g. mole of o-(3'-ethylbenzoyl)benzoyl chloride in 75 ml. of absolute DMF. Stir the resulting solution at 60° for two days. Remove the DMF in vacuo to obtain the title compound.

EXAMPLE 14

8-bromo-9-butyl-3-fluoro-6a-(p-trifluoromethylphenyl)-6,6a-dihydroisoindolo[2,1-a]quinazoline-5,11-dione

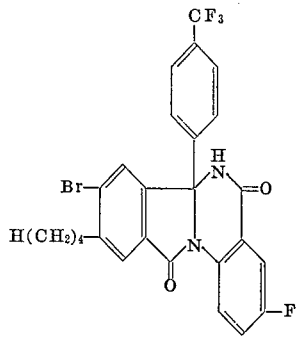

Dissolve 0.055 g. mole of 5-fluoroanthranilamide and 0.05 g. mole of 4-bromo-5-butyl-2-(4'-trifluoromethylbenzoyl)benzoyl chloride in 75 ml. of absolute DMF. Stir the resulting solution at 60° for two days. Remove the DMF in vacuo to obtain the title compound.

EXAMPLE 15

8-bromo-9-butyl - 3 - fluoro-6-methyl-6a-(p-trifluoromethylphenyl) - 6,6a - dihydroisoindolo[2,1-a]quinazoline-5,11-dione

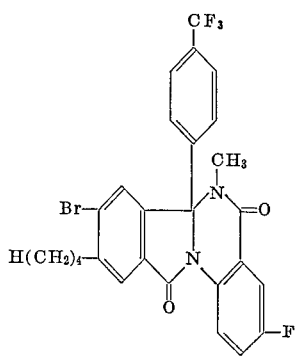

Dissolve 0.055 g. mole of 5-fluoroanthranilic acid N-methylamide and 0.05 g. mole of 4-bromo-5-butyl-2-(4'-trifluoromethylbenzoyl)benzoyl chloride in 75 ml. of absolute DMF. Stir the resulting solution at 60° for two days. Remove the DMF in vacuo to obtain the title compound.

EXAMPLE 16

6a-(3',5' - dimethyl - 4' - fluorophenyl)-3,9-dinitrofluoromethyl-8-propoxy - 6,6a - dihydoisoindolo[2,1-a]quinazoline-5,11-dione.

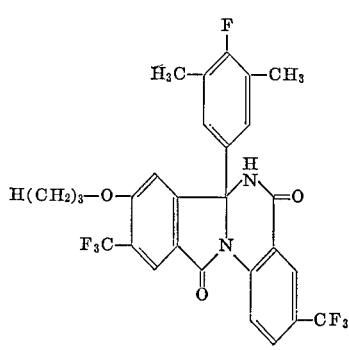

Dissolve 0.055 g. mole of 5-trifluoromethylanthranilamide and 0.05 g. mole of 2-(3',5'-dimethyl-4'-fluorobenzoyl-4-propoxy-5-trifluoromethylbenzoyl chloride in 75 ml. of absolute DMF. Stir the resulting solution at 60° for two days. Remove the DMF in vacuo to obtain the title compound.

EXAMPLE 17

6a-(3'-amyloxy - 5' - trifluoromethylphenyl)-9-methoxy-8-propyl - 6,6a - dihydroisoindolo[2,1-a]quinazoline-5,11-dione

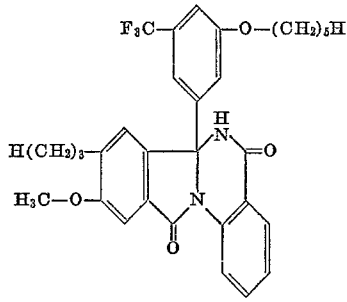

Dissolve 0.055 g. mole of anthranilamide and 0.05 g. mole of 2-(3'-amyloxy-5'-trifluoromethylbenzoyl)-5-methoxy-4-propylbenzoyl chloride in 75 ml. of absolute DMF. Stir the resulting solution at 60° for two days. Remove the DMF in vacuo to obtain the title compound.

EXAMPLE 18

9-bromo-6a-(3'-ethoxy-4'-ethylphenyl)-6,6a-dihydroisoindolo[2,1-a]quinazoline-5,11-dione

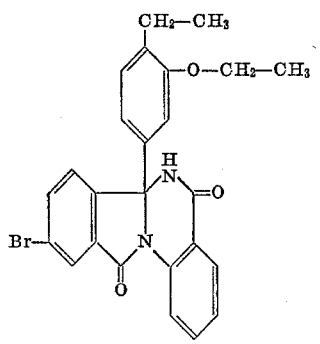

Dissolve 0.055 g. mole of anthranilamide and 0.05 g. mole of 5 - bromo-2-(3'-ethoxy-4'-ethylbenzoyl)benzoyl chloride in 75 ml. of absolute DMF. Stir the resulting solution at 60° for two days. Remove the DMF in vacuo to obtain the title compound.

EXAMPLE 19

8,9-difluoro-3-propyl-6a-(p-propylphenyl)-6,6a-dihydroisoindolo[2,1-a]quinazoline-5,11-dione

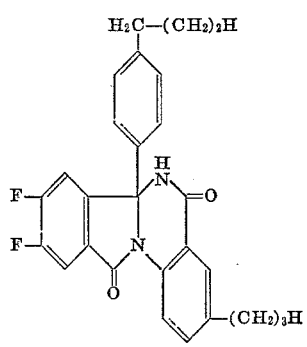

Disolve 0.055 g. mole of 5-propylanthranilamide and 0.05 g. mole of 4,5-difluoro-2-(p-propylbenzoyl)benzoyl chloride in 75 ml. of absolute DMF. Stir the resulting solution at 60° for two days. Remove the DMF in vacuo to obtain the title compound.

EXAMPLE 20

8,9-dimethyl-6a-(3'-methoxyphenyl)-6,6a-dihydroisoindolo[2,1-a]quinazoline-5,11-dione

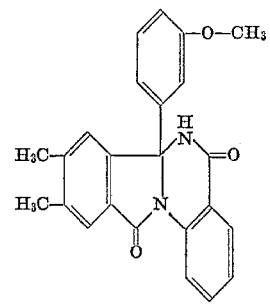

Dissolve 0.055 g. mole of anthranilamide and 0.05 g. mole of 4,5-dimethyl-2-(3'-methoxybenzoyl)benzoyl chloride in 75 ml. of absolute DMF. Stir the resulting solution at 60° for two days. Remove the DMF in vacuo to obtain the title compound.

EXAMPLE 21

6a-(p-amyloxyphenyl)-6,6a-dihydroisoindolo[2,1-a]quinazoline-5,11-dione

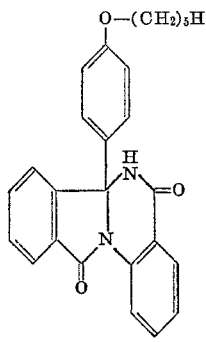

Dissolve 0.055 g. mole of anthranilamide and 0.05 g. mole of 2-(4'-amyloxybenzoyl)benzoyl chloride in 75 ml. of absolute DMF. Stir the resulting solution at 60° for two days. Remove the DMF in vacuo to obtain the title compound.

Examples 1 to 21 illustrate that any of the substituents contemplated for $R^1$ can be in any of the 3-, 3'-, 4'-, 5'-, 8- and 9-positions. Corresponding compounds (Ia), (II) and (III) are prepared in accord with reaction schemes noted in the introductory text and illustrated in specific examples which follow.

When X is hydroxy, reaction (A) is also effected in a solvent inert both to the reactants and to the reaction product under the reaction conditions. The reaction is conducted under reflux and with the reactants in contact with a catalytic amount of $H^+$ ions.

The inert solvent is any polar solvent, such as those noted heretofore, or a further solvent, such as benzene; alkylbenzene, e.g. toluene; chlorobenzene; dichlorobenzene; cycloalkane, e.g. cyclopentane; tetralin and other high boiling hydrocarbons.

To provide a source of hydrogen ($H^+$) ions, either an organic or an inorganic acid may be used. Para-toluenesulfonic acid is preferred, but other acids, such as alkane sulfonic, e.g. methane sulfonic; arylsulfonic, e.g. phenylsulfonic; phosphoric; acid ion exchange resin, e.g. "Dowex–50"; acid activated aluminosilicates, e.g. "Tonsil," also produce favorable results.

EXAMPLE 22

6a-phenyl-6,6a-dihydroisoindolo[2,1-a]quinazoline-5,11-dione

Admix in a flask equipped with a stirrer, condenser and Dean Stark tube (device for separating water from condensate) 0.1 g. mole of o-benzoylbenzoic acid, 0.105 g.

mole of anthranilamide, 1.1 g. of p-toluenesulfonic acid and 350 ml. of toluene. Stir and reflux until water fails to condense in the Dean-Stark tube. Remove the solvent in vacuo and crystallize the residue from methanol to obtain the title compound.

EXAMPLE 23

6a-(p-tolyl)-6,6a-dihydroisoindolo[2,1-a]quinazoline-5,11-dione

Admix in a flask equipped with a stirrer, condenser and Dean Stark tube 0.02 g. mole of o-(4-methylbenzoyl) benzoic acid, 0.022 g. mole of anthranilamide, 0.2 g. of p-toluenesulfonic acid and 100 ml. of technical dichlorobenzenes. Stir and reflux until water fails to condense in the Dean-Stark tube. Remove the solvent in vacuo and crystallize the residue from methanoldimethylformamide to obtain the title compound, M.P. 289° to 290°.

EXAMPLE 24

6a-(p-chlorophenyl)-6,6a-dihydroisoindolo[2,1-a]quinazoline-5,11-dione

Admix in a flask equipped with a stirrer, condenser and Dean-Stark tube 0.02 g. mole of o-(4-chlorobenzoyl)benzoic acid, 0.022 g. mole of anthranilamide, 0.2 g. of p-toluenesulfonic acid and 100 ml. of technical dichlorobenzenes. Stir and reflux until water fails to condensate in the Dean-Stark tube. Remove the solvent in vacuo and crystallize the residue (titled compound, M.P. 194° to 197°) from ethanol-DMF.

EXAMPLE 25

6a-(3'-amino-4'-chlorophenyl)-6,6a-dihydroisoindolo[2,1-a]quinazoline-5,11-dione Admix in a flask equipped with a stirrer, condenser and Dean-Stark tube 0.02 g. mole of 3-amino-4-chloro-2'-carboxybenzophenone, 0.03 g. mole of anthranilamide, 0.2 g. of p-toluenesulfonic acid and 100 ml. of technical dichlorobenzene. Stir and reflux until water fails to condense in the Dean-Stark tube. Remove the solvent in vacuo and crystallize the residue (title compound, M.P. 284° to 286°) from ethanol-DMF.

EXAMPLE 26

6-methyl-6a-phenyl-6,6a-dihydroisoindolo[2,1-a]quinazoline-5,11-dione

Admix in a flask equipped with a stirrer, condenser and a Dean-Stark tube 0.03 g. mole of o-benzoylbenzoic acid, 0.02 g. of mole of N-methylanthranilamide, 0.01 g. of p-toluenesulfonic acid and 50 ml. of technical dichlorobenzene. Stir and reflux until water fails to condense in the Dean-Stark tube. Remove the solvent in vacuo and crystallize the residue (title compound, M.P. 226° to 227°) from i-propanol-DMF.

The title compound of this example is particularly suitable as a sedative.

*Reaction (B)*.—This reaction is conducted in an ether solution under reflux. In excess of three hours is ordinarily required for completion. Stirring may be employed, but is not required.

Exemplary ether solvents are: di(lower)alkyl ether, e.g. diethyl ether, wherein each alkyl is, independently, one which has from two to five carbon atoms; tetrahydrofuran; N - (lower)alkylmorpholine, e.g. N-methyl-morpholine, wherein the alkyl is one which has from one to four carbon atoms.

EXAMPLE 27

6a-phenyl-6,6a-dihydroisoindolo[2,1-a]quinazolin-5(11H)one

Dissolve 0.066 g. mole of lithium aluminum hydride (LAH) in 500 ml. of absolute tetrahydrofuran (THF) in a flask equipped with a stirrer and a water-cooled soxhlet extractor. Charge the extraction cup with 0.031 g. mole of of the ttiled compound of Example 1. Blanket the system with nitrogen. Stir and reflux until the extraction cup is emptied.

Cool the resulting yellow-brown solution in an ice bath, and then admix the cooled product with 50 ml. of ethyl acetate. Thereafter admix with the resulting material 30 ml. of 2 N sodium hydroxide. Filter off the solids and concentrate the filtrate in vacuo. Crystallize the residue (title compound, M.P. 253° to 255°) from methanol.

The title compound of this example is particularly suitable as a sedative. Compounds (Ia) and (III) have the same scope of substitution as compounds (Ib) and are prepared from corresponding compounds (Ib), such as those illustrated in Examples 1 to 26, in a manner, e.g., similar to those illustrated in Examples 27 and 28, respectively, the latter examples demonstrating reaction (B).

EXAMPLE 28

6a-phenyl-5,6,6a,11-tetrahydroisoindolo[2,1-a]quinazoline

Dissolve 0.36 g. mole of LAH in 1500 ml. of absolute THF in a flask equipped with a stirrer and a water-cooled soxhlet extractor. Charge the extraction cup with 0.17 g. mole of the titled compound of Example 1. Blanket the system with nitrogen. Stir and reflux for seven days.

Cool the resultant solution in an ice bath, and then admix the cooled product with 200 ml. of ethyl acetate. Thereafter admix with the resulting material 37 ml. of 2 N sodium hydroxide and then 41 ml. of water. Filter off the solids, and concentrate the filtrate in vacuo.

Crystallize the residue from methanol to obtain a product, M.P. 173° to 240°. Admix this product with 2 N hydrochloric acid. Filter off the insoluble fraction (title compound of Example 27). Neutralize the acid filtrate with 2N sodium hydroxide. Filter off the precipitated solid and recrystallize same from DMF-methanol-water to obtain the title compound, M.P. 149° to 151°.

*Reaction (C)*.—This reaction is effected in a solvent medium. A dialkyl formamide, such as di(lower)alkyl formamide, e.g. N,N-dimethylformamide (DMF), provides a suitable solvent.

EXAMPLE 29

6-methyl-6a-phenyl-6,6a-dihydroisoindolo[2,1-a]quinazolin-5(11H)-one

Dissolve 0.016 g. mole of the title compound of Example 27 in 180 ml. of absolute DMF. Admix the resulting solution with 0.018 g. mole of 50 percent mineral oil sodium hydride dispersion, and heat the product at 40° until hydrogen evolution ceases.

Add 0.018 g. mole of methyl iodide to the resulting system, and stir overnight (about fifteen hours) at room temperature (20°). Thereafter remove the solvent in vacuo, and crystallize the resultant solid (title compound, M.P. 178° to 180°) from methanol.

The title compound of this example is particularly suitable as a sedative and/or antihypertensive (cardiovascular agent).

*Reaction (D)*.—This reaction is conducted in the same manner and under the same conditions as is Reaction (C), except compound (Ib), rather than compound (Ia), is employed as a reactant.

EXAMPLE 30

6-methyl-6a-phenyl-6,6a-dihydroisoindolo[2,1-a]quinazoline-5,11-dione

Dissolve 0.03 g. mole of the title compound of Example 1 in 360 ml. of DMF. Admix with resulting solution 0.035 g. mole of 50 percent mineral oil sodium hydride dispersion, and warm the product at 40° until hydrogen evolution ceases.

Add 0.35 g. mole of methyl iodide to the resulting system, and stir overnight at room temperature. Thereafter remove the solvent in vacuo and crystallize the resultant

EXAMPLE 31

3 - bromo - 6a-(3'-bromo-4'-ethoxyphenyl)-6-butyl-8-trifluoromethyl - 6,6a-dihydroisoindolo[2,1-a]quinazoline-5,11-dione Dissolve 0.03 g. mole of the title compound of Example 4 in 360 ml. of DMF. Admix with the resulting solution 0.035 g. mole of 50 percent mineral oil sodium hydride dispersion, and warm the product at 40° until hydrogen evolution ceases.

Add 0.35 g. mole of butyl bromide to the resulting system, and stir overnight at room temperature. Thereafter remove the solvent in vacuo to obtain the title compound.

EXAMPLE 32

8 - chloro-6-(cis-2-butenyl)-6a-(3'-chlorophenyl)-3-ethyl-6,6a-dihydroisoindolo[2,1-a]quinazoline-5,11-dione Dissolve 0.03 g. mole of the title compound of Example 7 in 360 ml. of DMF. Admix with the resulting solution 0.035 g. mole of 50 percent mineral oil sodium hydride dispersion, and warm the product at 40° until hydrogen evolution ceases.

Add 0.35 g. mole of cis-2-butenyl chloride to the resulting system, and stir overnight at room temperature. Thereafter remove the solvent in vacuo to obtain the title compound.

EXAMPLE 33

6a - (3' - bromo-5'-trifluoromethylphenyl)-6-(3-butenyl)-6,6a-dihydroisoindolo[2,1-a]quinazoline-5,11-dione Dissolve 0.03 g. mole of the title compound of Example 8 in 360 ml. of DMF. Admix with the resulting solution 0.035 g. mole of 50 percent mineral oil sodium hydride dispersion, and warm the product at 40° until hydrogen evolution ceases.

Add 0.35 g. mole of 3-butenyl chloride to the resulting system, and stir overnight at room temperature. Thereafter, remove the solvent in vacuo to obtain the title compound.

EXAMPLE 34

6 - (β-piperidinoethyl)-6a-(3'-bromo-4'-ethoxyphenyl)-8-trifluoromethyl - 6,6a-dihydroisoindolo[2,1-a]quinazoline-5,11-dione Dissolve 0.03 g. mole of the title compound of Example 9 in 360 ml. of DMF. Admix with the resulting solution 0.035 g. mole of 50 percent mineral oil sodium hydride dispersion, and warm the product at 40° until hydrogen evolution ceases.

Add 0.35 g. mole of β-piperidinoethyl bromide to the resulting system, and stir overnight at room temperature. Thereafter remove the solvent in vacuo to obtain the title compound.

EXAMPLE 35

6 - (β - pyrrolidinoethyl) - 3 - butyl-6a-(4'-butyl-3',5'-difluorophenyl) - 6,6a - dihydroisoindolo[2,1-a]quinazoline-5,11-dione Dissolve 0.03 g. mole of the title compound of Example 10 in 360 ml. of DMF. Admix with the resulting solution 0.035 g. mole of 50 percent mineral oil sodium hydride dispersion, and warm the product at 40° until hydrogen evolution ceases.

Add 0.35 g. mole of β-pyrrolidinoethyl bromide to the resulting system, and stir overnight at room temperature. Thereafter remove the solvent in vacuo to obtain the title compound.

EXAMPLE 36

3-amyl-6a-(3'-amyl-5'-chlorophenyl)-6-propargyl-6,6a-dihydroisoindolo[2,1-a]quinazoline-5,11-dione Dissolve 0.03 g. mole of the title compound of Example 11 in 360 ml. of DMF. Admix with the resulting solution 0.035 g. mole of 50 percent mineral oil sodium hydride dispersion, and warm the product at 40° until hydrogen evolution ceases.

Add 0.35 g. mole of propargyl chloride to the resulting system, and stir overnight at room temperature. Thereafter remove the solvent in vacuo to obtain the title compound.

EXAMPLE 37

6-allyl-6a-(3'-ethylphenyl)-6,6a-dihydroisoindolo-[2,1-a]quinazoline-5,11-dione

Dissolve 0.03 g. mole of the title compound of Example 13 in 360 ml. of DMF. Admix with the resulting solution 0.035 g. mole of 50 percent mineral oil sodium hydride dispersion, and warm the product at 40° until hydrogen evolution ceases.

Add 0.35 g. mole of allyl bromide to the resulting system, and stir overnight at room temperature. Thereafter remove the solvent in vacuo to obtain the title compound.

EXAMPLE 38

8-bromo-9-butyl-3-fluoro - 6 - methyl - 6a - (p - trifluoromethylphenyl)-6,6a - dihydroisoindolo[2,1 - a]quinazoline-5,11-dione Dissolve 0.03 g. mole of the title compound of Example 14 in 360 ml. of DMF. Admix with the resulting solution 0.035 g. mole of 50 percent mineral oil sodium hydride dispersion, and warm the product at 40° until hydrogen evolution ceases.

Add 0.35 g. mole of methyl iodide to the resulting system, and stir overnight at room temperature. Thereafter remove the solvent in vacuo to obtain the title compound.

EXAMPLE 39

9-bromo-6a-(3'-ethoxy-4'-ethylphenyl) - 6 - trans - 2-butenyl)-6,6a - dihydroisoindolo[2,1 - a]quinazoline-5,11-dione Dissolve 0.03 g. mole of the title compound of Example 18 in 360 ml. of DMF. Admix with the resulting solution 0.035 g. mole of 50 percent mineral oil sodium hydride dispersion, and warm the product at 40° until hydrogen evolution ceases.

Add 0.35 g. mole of trans-2-butenyl chloride to the resulting system and stir overnight at room temperature. Thereafter remove the solvent in vacuo to obtain the title compound.

EXAMPLE 40

8,9-difluoro-6-(γ-dimethylaminopropyl) - 3 - propyl - 6a-(p-propylphenyl)-6,6a-dihydroisoindolo[2,1 - a]quinazoline-5,11-dione Dissolve 0.03 g. mole of the title compound of Example 19 in 360 ml. of DMF. Admix with the resulting solution 0.035 g. mole of 50 percent mineral oil sodium hydride dispersion, and warm the product at 40° until hydrogen evolution ceases.

Add 0.35 g. mole of γ-dimethylaminopropyl chloride to the resulting system, and stir overnight at room temperature. Thereafter remove the solvent in vacuo to obtain the title compound.

EXAMPLE 41

9-bromo-6a-(3'-ethoxy-4'-ethylphenyl)-6-(γ - morpholinopropyl) - 6,6a - dihydroisoindolo[2,1 - a]quinazoline-5,11-dione Dissolve 0.03 g. mole of the title compound of Example 20 in 360 ml. of DMF. Admix with the resulting solution 0.035 g. mole of 50 percent mineral oil sodium hydride dispersion, and warm the product at 40° until hydrogen evolution ceases.

Add 0.35 g. mole of γ-morpholinopropyl chloride to the resulting system, and stir overnight at room temperature. Thereafter remove the solvent in vacuo to obtain the title compound.

EXAMPLE 42

6a-(p-amyloxyphenyl) - 6 - [β - (4 - methylpiperazino) ethyl]-6,6a-dihydroisoindolo[2,1 - a]quinazoline - 5,11-dione Dissolve 0.03 g. mole of the title compound of Example 21 in 360 ml. of DMF. Admix with the resulting solution 0.035 g. mole of 50 percent mineral oil sodium hydride dspersion, and warm the product at 40° until hydrogen evolution ceases.

Add 0.35 g. mole of β - (4 - methylpiperazino)ethyl bromide to the resulting system, and stir overnight at room temperature. Thereafter remove the solvent in vacuo to obtain the title compound.

*Reaction (E)*.—This reaction differs from Reaction (B) essentially only in the nature of a single reactant. Compound (Ia) is employed rather than compound (Ib), which is essential to Reaction (B).

EXAMPLE 43

5-hydroxy-6-methyl-6a-phenyl-5,6,6a,11-tetrahydro-isoindolo[2,1-a]quinazoline

Dissolve 0.034 g. mole of LAH in 250 ml. of absolute THF in a flask eqipped with a stirrer and water-cooled soxhlet extractor. Charge the extraction cup of the extractor with 0.015 g. mole of the title compound of Example 29, and blanket the system with nitrogen. Stir and reflux until the reaction cup is emptied.

Cool the resulting solution in an ice bath, and admix the cooled product with 25 ml. of ethyl acetate. Thereafter admix with the resulting material 15 ml. of 7 N sodium hydroxide. Filter off the solids and concentrate the filtrate in vacuo. Crystallize the residue (title compound, M.P. 193° to 195°) from methanol-water.

The title compound of this example is particularly suitable as a sedative.

Compounds (III) have the same scope of substitution as do compounds (II) and compounds (Ib).

*Reaction (F)*.—In a solvent system containing an excess of hydrogen ions a 2-carboxy benzophenone (VIII) is heated (from about 100° to reflux temperature, inclusive) with an anthranilic acid (IX) to obtain lactone (X).

EXAMPLE 44

2-(o-carboxyphenyl)-3-hydroxy-3-phenyl-isoindolone lactone

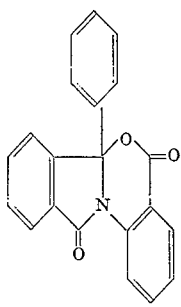

Admix in a flask equipped with a stirrer, condenser and Dean-Stark tube, 0.05 g. mole of 0-benzoylbenzoic acid, 0.06 g. mole of anthranilic acid, 0.1 g. of p-toluene-sulfonic acid and 150 ml. of technical dichlorobenzene. Reflux for four hours (until water fails to condense in the Dean-Stark tube). Remove the solvent in vacuo and crystallize the residue from ethanol to obtain the title compound, M.P. 184° to 184.5°.

*Reaction (G)*.—In a polar solvent, such as lower alkanols, e.g. ethanol, and dioxane, lactone (X) is heated at a temperature from about 45° to the reflux temperature, inclusive, in admixture with an amine, $H_2N—R^2$, to obtain compounds (Ib).

EXAMPLE 45

6-n-butyl-6a-phenyl-6,6a-dihydroisoindolo[2,1-a] quinazoline-5,11-dione

Admix in a flask 0.005 g. mole (1.64 g.) of the title compound of Example 44, 0.041 g. mole (3 ml.) of n-butylamine and 50 ml. of anhydrous ethanol. Reflux the mixture for sixteen hours and then cool to room temperature. Remove the solvent in vacuo to obtain the title compound, M.P. 158° to 159°.

The preparation of compounds (Ia) [Reactions (B) and (C)], (Ib) [Reactions (A), (D) and (G)] and III [Reactions (B) and (E)] are exemplified in the preceding examples, which are only exemplary in nature. All compounds within the scope of each of the noted types of compounds are prepared in the same manner as the examples of the stated reactions. The only material change is in the selection of the corresponding starting reactants. For all compounds of this invention $R^1$ and $R^7$ include every combination within the enumerated definitions.

Compounds (IV), (V), (VI), (VII), (VIII), (IX) and $R^2$—$NH_2$ are either known or are prepared from available starting materials according to established analogy procedures.

It is thought that the invention will be understood by the foregoing description. The processes, the novel intermediates and the final products hereinbefore described are merely illustrative of preferred embodiments of the invention.

What is claimed is:

1. A compound of the formula

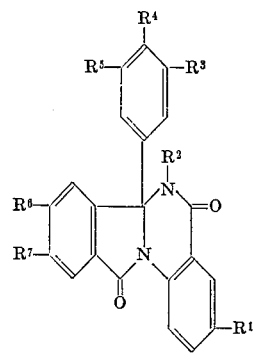

wherein each of $R^1$, $R^3$, $R^5$, $R^6$ and $R^7$ is, independently, a member selected from the group consisting of hydrogen, lower alkyl, lower alkoxy, fluoro, chloro, bromo and trifluoromethyl;

$R^2$ is a member selected from the group consisting of a hydrogen atom, straight chain alkyl from one to four carbon atoms, allyl, cis-2-butenyl, trans-2-butenyl, 3-butenyl, propargyl, ω-di(lower)alkylamino (lower)alkyl, ω-piperidino(lower)alkyl, ω-morpholino (lower)alkyl, ω - pyrrolidino(lower)alkyl and ω-4-(lower)alkylpiperazino(lower)alkyl; and $R^4$ is a member selected from the group consisting of hydrogen, lower alkyl, lower alkoxy, fluoro, chloro and bromo.

2. The compound according to claim 1 which is 6a-(p - chlorophenyl) - 6,6a - dihydroisoindolo[2,1-a]quinazoline-5,11-dione.

3. The compound according to claim 1 which is 6a-(p - tolyl) - 6,6a - dihydroisoindolo[2,1-a] quinazoline-5,11-dione.

4. The compound according to claim 1 which is 3-chloro - 6a - phenyl - 6,6a - dihydroisoindolo[2,1-a] quinazoline-5,11-dione.

5. The compound according to claim 1 which is 6a-(3' - amino - 4' - chlorophenyl) - 6,6a - dihydroisoindolo [2,1-a]quinazoline-5,11-dione.

6. The compound according to claim 1 which is 6a-phenyl - 6,6a - dihydroisoindolo[2,1-a]quinazoline-5,11-dione.

7. The compound according to claim 1 which is 6-n-butyl - 6a - phenyl - 6,6a - dihydroisoindolo[2,1-a]quinazoline-5,11-dione.

8. The compound according to claim 1 which is 6-methyl - 6a - phenyl - 6,6a - dihydroisoindolo[2,1-a]quinazoline-5,11-dione.

9. A compound of the formula

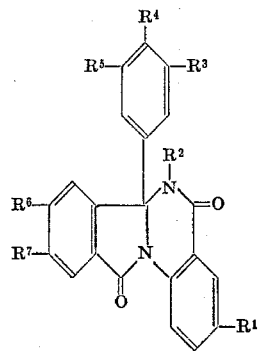

wherein each of $R^1$, $R^6$ and $R^7$ is, independently, a member selected from the group consisting of hydrogen, lower alkyl, lower alkoxy, fluoro, chloro, bromo and trifluoromethyl;

$R^2$ is a member selected from the group consisting of a hydrogen atom, straight chain alkyl from one to four carbon atoms, allyl, cis-2-butenyl, trans-2-butenyl, 3-butenyl, propargyl, ω-di(lower)alkylamino (lower) alkyl, ω-piperidino(lower)alkyl, ω-morpholino(lower) alkyl, ω-pyrrolidino(lower)alkyl and ω-4-(lower)alkyl-piperazino(lower)alkyl;

each of $R^3$ and $R^5$ is a member selected from the group consisting of hydrogen, lower alkyl, lower alkoxy, fluoro, chloro and bromo; and $R^4$ is trifluoromethyl.

10. 6a - phenyl - 6,6a - dihydroisoindolo[2,1-a]quinazolin-5(11H)one.

11. 6 - methyl - 6a - phenyl - 6,6a - dihydroisoindolo[2,1-a]quinazolin-5(11H)one.

12. 5 - hydroxy - 6 - methyl - 6a - phenyl - 5,6,6a,11-tetrahydroisoindolo[2,1-a]quinazoline.

13. 6a - phenyl - 5,6,6a,11 - tetrahydroisoindolo[2,1-a]quinazoline.

References Cited

Honzl: C. A. 50, 5621–2 (1956).

ALEX MAZEL, Primary Examiner

R. V. RUSH, Assistant Examiner

U.S. Cl. X.R.

260—256.4, 244, 247.2; 424—251, 248